Dec. 1, 1970  D. S. KNIGHTS  3,544,851
ELECTRIC STEPPING SWITCHES
Filed Nov. 18, 1968  14 Sheets-Sheet 5

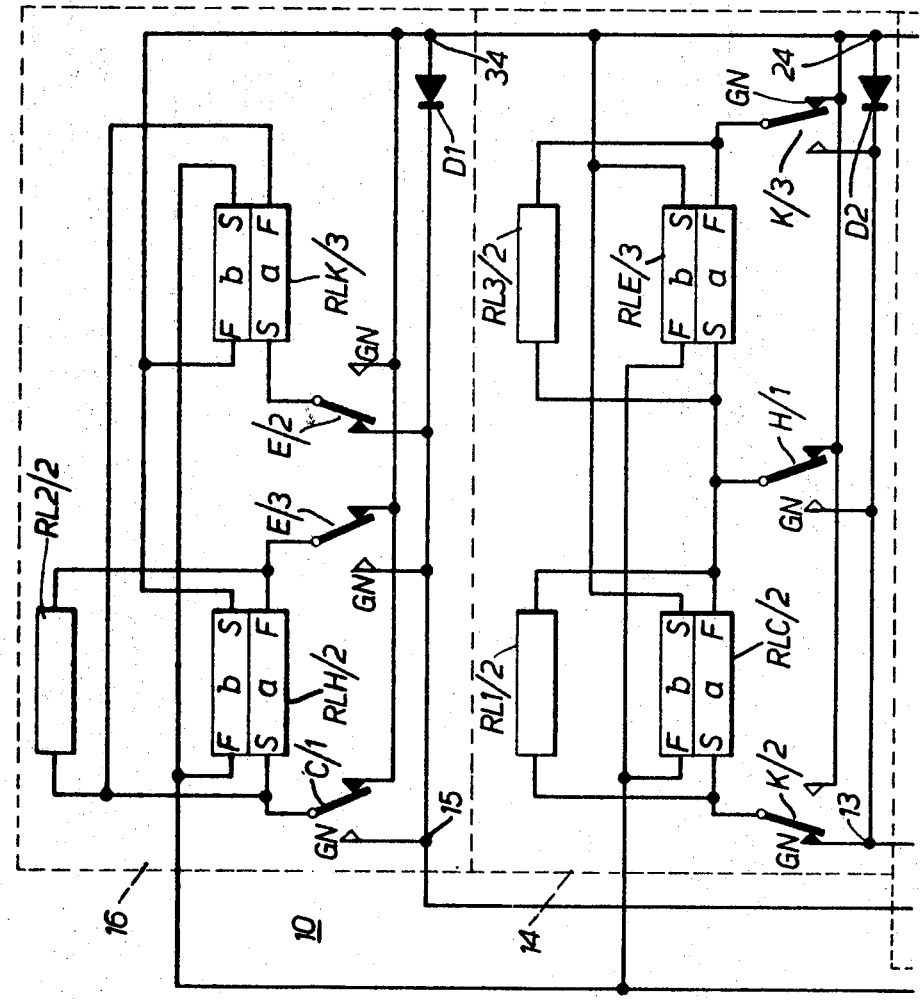

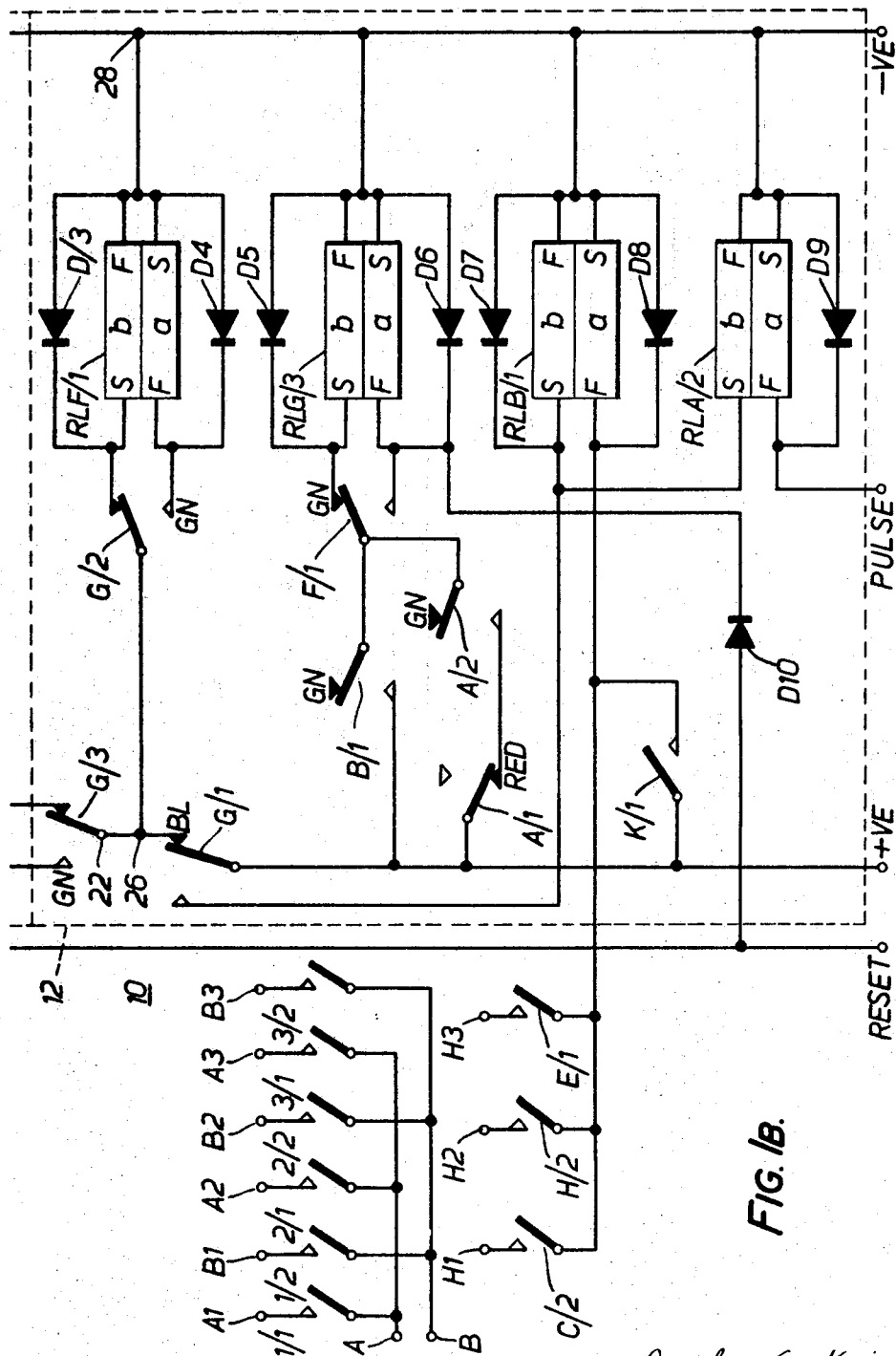

Douglas S. Knights
INVENTOR

BY Lawrence E. Laubscher
ATTORNEY

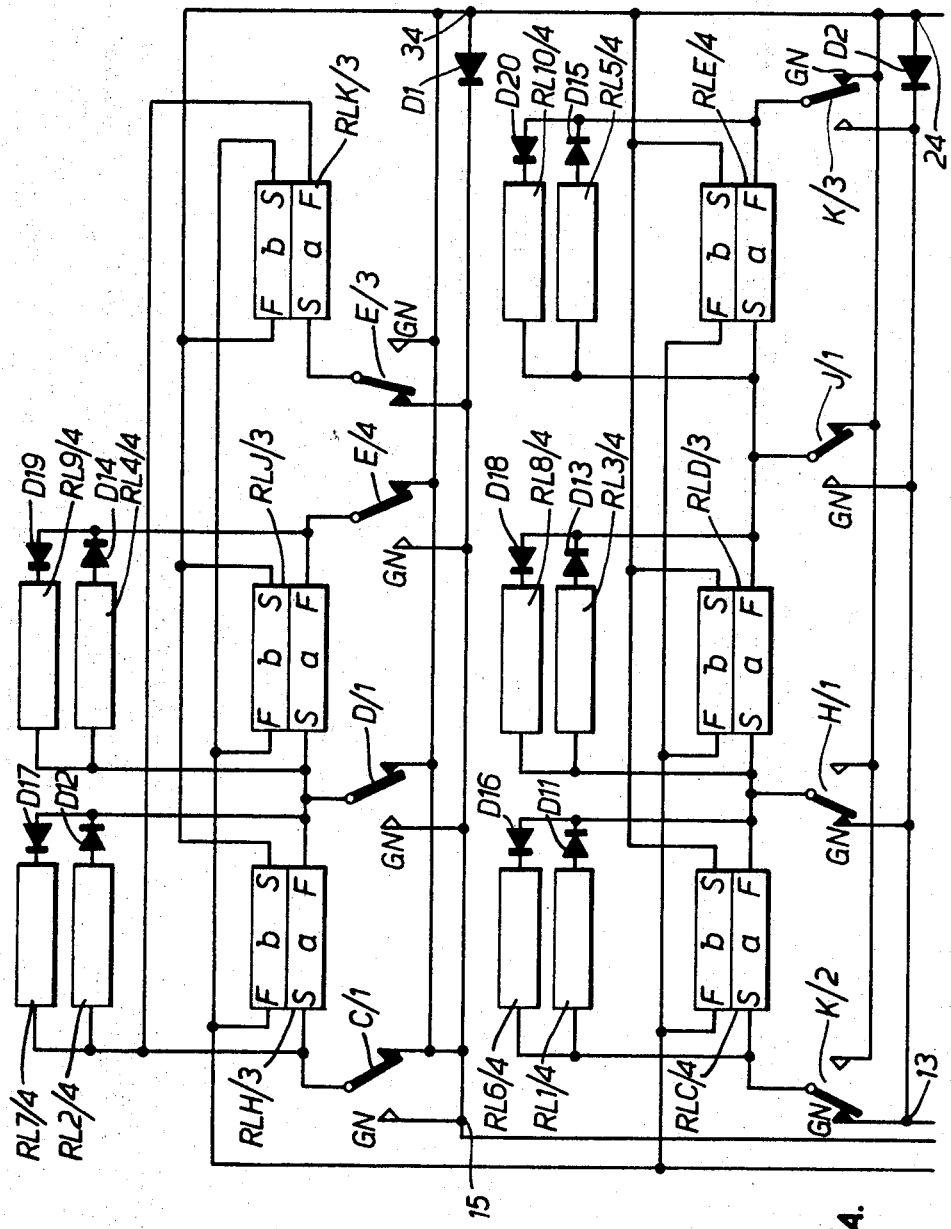

Douglas S. Knights
INVENTOR

BY Lawrence E. Laubscher
ATTORNEY

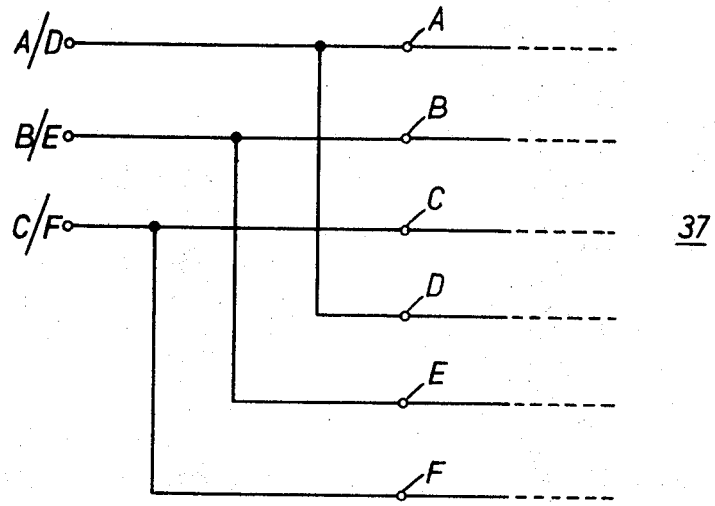
FIG. 7a.
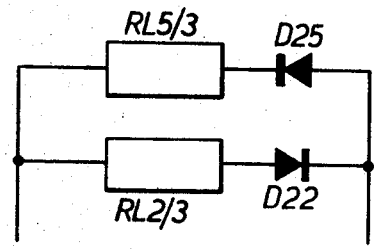
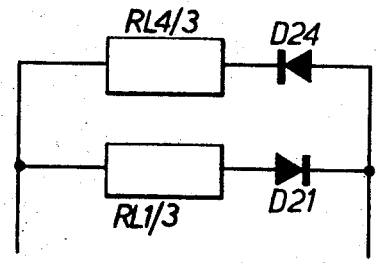 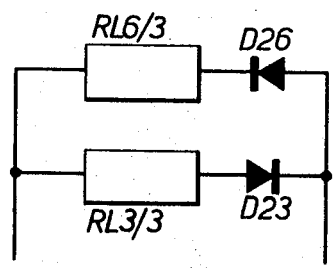
FIG. 7b.

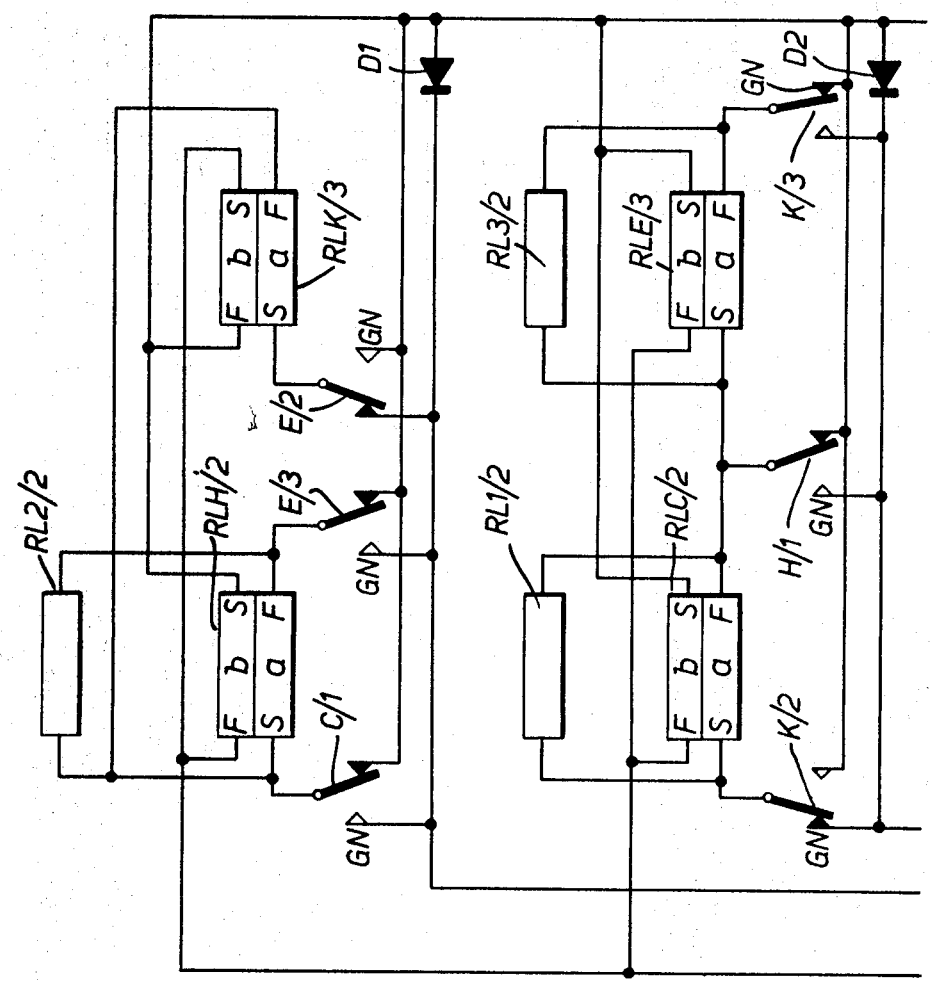

United States Patent Office 3,544,851
Patented Dec. 1, 1970

3,544,851
ELECTRIC STEPPING SWITCHES
Douglas Sydney Knights, West Wickham, England,
assignor to B&R Relays Limited
Filed Nov. 18, 1968, Ser. No. 776,550
Claims priority, application Great Britain, Nov. 16, 1967,
52,273/67
Int. Cl. H01h 47/14
U.S. Cl. 317—139                            11 Claims

ABSTRACT OF THE DISCLOSURE

A uniselector stepping switch has a series of energising windings, which are to be successively energised in sequence, arranged alternately in two sub-circuits. A drive circuit responds to input pulses to energise the two sub-circuits alternately. Magnetically operable bistable contacts operated by the respective windings prepare the next windings in the sequence for operation upon changeover of the sub-circuit being energised.

---

The present invention relates to electric switches, and more particularly to electric stepping switches adapted to operate a series of electric contacts sequentially.

It is an object of the invention to provide a stepping switch, utilising sealed magnetic reed switches, which is reliable in operation.

According to one aspect of the invention, there is provided an electric stepping switch comprising a drive circuit which is responsive to a sequence of input pulses to energise two terminals in the switch alternately, a series of energising windings arranged to be successively energised in sequence and connected or connectible alternately with respect to said sequence to said two terminals, a series of bistable contact sets each operable upon energisation of a respective one of said windings to prepare the next windings in the sequence for energisation, and a series of output contact sets connected to respective output terminals of one switch and operable in sequence upon energisation of respective ones of said energising windings.

The invention will be described by way of examples with reference to the accompanying drawings, wherein:

FIG. 1 diagrams of FIGS. 1A and 1B to define a three or six-step two-bank "uniselector" switch in accordance with the invention;

FIGS. 7a and 7b are circuit diagrams of an alternative modification to the switch of FIG. 2;

Figure 2A:
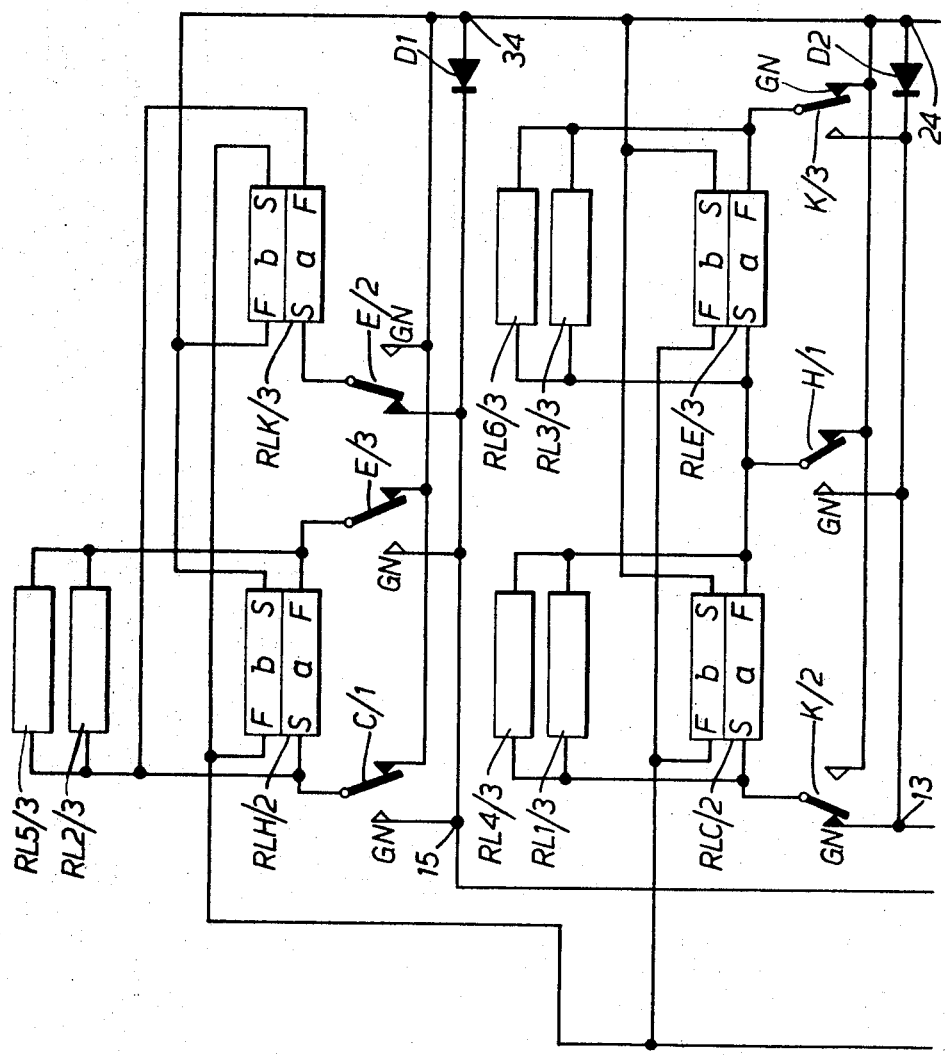
FIG. 2 illustrates the manner of arrangement of the circuit diagrams of FIGS. 2A, 2B and 2C to define a three or six-step six-bank "uniselector" switch in accordance with the invention.

The switch 10 of FIG. 1 comprises relay RLA, RLB, RLC, RLE, RLF, RLG, RLH, RLK, the respective solenoids RLA/2, RLB/1, RLC/2, RLE/3, RLF/1, RLG/3, RLH/2 and RLK/3 of which each have two windings $a$ and $b$. Each of these windings has two terminals, one marked "S" for "start" and the other "F" for "finish," denoting the polarity of the winding. Positive polarity (say) applied to terminal "S" of either winding $a$ or $b$ of any given solenoid will have the same operative effect upon the contact sets of that relay. Conversely, positive polarity applied to terminal "F" of either winding $a$ or $b$ of any given solenoid will have the same operative effect upon the contact sets of that relay.

Relay RLA comprises contact sets A/1 and A/2.
Relay RLB comprises contact set B/1.
Relay RLC comprises contact sets C/1 and C/2.
Relay RLE comprises contact sets E/1, E/2 and E/3.
Relay RLF comprises contact set F/1.
Relay RLG comprises contact sets G/1, G/2 and G/3.
Relay RLH comprises contact sets H/1 and H/2.
Relay RLK comprises contact sets K/1, K/2 and K/3.

Each of these contact sets is a sealed magnetic reed switch.

Contact set A/1 is a monstable magnetically polarised contact set, normally "restored" in the position shown, closed to the terminal marked "RED." It operates, moving away from the "RED" terminal, whenever positive voltage ("$+ve$") is applied to the "F" (meaning finish") terminal of winding $a$ or $b$ of solenoid RLA/2, this being referred to hereinafter as "reverse energisation" (or "ren" for short) of winding A$a$ or A$b$ respectively, and restores when such voltage is removed. A/1 does not respond to $+ve$ applied to the "S" (meaning "start") terminal of A$a$ or A$b$, referred to as "forward energisation" ("fen" for short) hereinafter.

Each of contact sets A/2, B/1, C/1, E/2, E/3, F/1 G/2, G/3, H/1, K/2 and K/3, is a bistable contact set which closes to the "GN" (meaning "green") terminal with $+ve$ applied to the S terminal of either $a$ or $b$ winding of the respective solenoid, this being referred to hereinafter as "forward energisation" ("fen" for short), and closes to the other unmarked contact (referred to hereinafter as "XGN") with $+ve$ applied to the F terminal ("ren") of either $a$ or $b$ winding of the respective solenoid, remaining in either position upon removal of the respective voltage.

Contact set G/1 is a monostable magnetically unpolarised changeover contact set, normally closed to the "BL" (meaning "blue") terminal. It can be changed over to the other, unmarked terminal, referred to as the XBL terminal when either of windings G$a$ and G$b$ is either forward or reverse energised (as hereinbefore defined).

Contact sets C/2, E/1, H/2, and K/1 are normally open contacts operable to close when their respective solenoid windings are either forward or reverse energised.

There are three further relays RL1, RL2, and RL3, having respective single winding solenoids RL1/2, RL2/2, and RL3/2 connected in parallel respectively with the $a$ windings of solenoids RLC/2, RLH/2, and RLE/3, and having pairs of normally open contact sets 1/1, 1/2, 2/1, 2/2, 3/1, and 3/2, which are operable to close whenever their respective solenoids are energised, whatever the polarity of energisation. Each of these contact sets also is a sealed magnetic reed switch.

In addition, there are nine transient suppression diodes D1 to D9 and one blocking diode D10.

The terminals "+VE" and "—VE" are connected in use to the positive and negative of a DC supply (not shown). The "RESET" terminal is connected to a reset switch (also not shown) which is operable to apply the positive potential at terminal "e+VE" momentarily to the "RE- SET" terminal, for the purpose of resetting all the relay contact sets to the positions shown. A "PULSE" terminal is arranged to receive positive pulses, called "stepping pulses," from a source not shown, for the purpose of operating the uniselector switch.

Terminals A1, A2, and A3 are connectible in turn, step by step, through contact sets 1/1, 2/1, and 3/1 to a common terminal A, and terminals B1, B2, and B3 are connectible in turn, step by step, through contact sets 1/2, 2/2, and 3/2 to a common terminal B.

The various connections are as shown in the drawing. Relays RLA, RLB, RLF, and RLG are arranged in a "drive circuit" 12. As will be described, bistable contact set G/3 changes over with successive input pulses, to energise terminals 13 and 15 alternately.

The "a" winding of relays RLC, RLH, RLE and RLK are arranged to be energised in that sequence, as will be described, and are arranged alternately as shown in two sub-circuits 14 and 16 connected respectively to the two terminals 13 and 15.

In operation, a positive reset pulse is applied to the RESET terminal prior to the connection of positive to the +VE terminal, to set all the relays so that the various contact sets are in the positions shown upon cessation of the reset pulse. In the description which follows, operation of any contact set from the position illustrated is recorded as "op," and restoration of any contact set to the illustrated position as "res." No change of a contact set (due to magnetic polarisation) is recorded as "nc(op)" or "nc(res)" according to whether the contact set is in the operated or restored condition.

There follows a description of a complete cycle of operation (after the reset pulse), commencing with "Power On"—the application of positive to +VE—and continuing with six stepping pulses to PULSE terminals.
I. "Power On":
   (1) C$a$ and F$b$ fen, and RL1 en (energised);
   (2) C/1, C/2, 1/1, 1/2 op; F/1 nc(res);
II. "First Stepping Pulse Commences":
   (3) A$a$ ren;
   (4) A/1 and A/2 op in preparation;
III. "First Stepping Pulse Ceases":
   (5) A$a$ dren (de-energises);
   (6) A/1 res; A/2 nc(op);
   (7) G$b$ fen;
   (8) G/1, G/2 and G/3 op;
   (9) C$a$ and F$b$ dfen and RL1 den (deenergise); and A$b$ and B$b$ fen;
   (10) A/1 nc(res); A/2 res; B/1 nc(res), C/1 nc(op); C/2 res; F/1 nc(res);
   (11) G dfen;
   (12) G/1 res; G/2 and G/3 nc(op);
   (13) A$b$ and B$b$ dfen; H$a$ fen; F$a$ ren; RL2 en;
   (14) H/1 and H/2 op; F/1 op; 2/1 and 2/2 op.

Thus the net results of the first stepping pulse has been the de-energisation of relays RLC and RL1, the reverse instead of forward energisation of relay RLF and the (forward energisation of relays RLH and RL2, the restoration of contact sets C/2, 1/1 and 1/2 and the operation of contact sets C/1, F/1, G/2, G/3, H/1, H/2, 2/1, and 2/2.

The practical effect of this has been to switch the connections of terminals A and B respectively from A1 and B1 terminals (to which they became connected at "Power On") to A2 and B2, in twelve stages.

By reason of the above-mentioned operation of C/1, G/2, G/3, H/1, and H/2, the net effect of commencement (Stage IV) and cessation (Stage V) of a second stepping pulse will be the de-energisation of relays RLH and RL2, the forward instead of reverse energistation of relay RLF and the (forward) energisation of relays RLE and RL3, accompanied by restoration of contact sets F/1, G/2, G/3, H/2, 2/1, and 2/2 and operation of contact sets E/2, E/3, 3/1, and 3/2 so that terminals A and B are now respectively connected to terminals A3 and B/3, in a further twelve stages (15) to (26), not described in detail.

A third stepping pulse at the PULSE terminal has the following effect:
VI. "Third stepping Pulse Commences":
   (27) A$a$ ren;
   (28) A/1 and A/2 op;

VII. "Third Stepping Pulse Ceases":
   (29) A$a$ dren;
   (30) A/1 res; A/2 nc(op);
   (31) G$b$ fen;
   (32) G/1, G/2 and G/3 op;
   (33) E$a$ dfen and RL3 den; A$b$ and B$b$ fen;
   (34) E/1 res; E/2 and E/3 nc(op); 3/1 and 3/2 res; A/1 nc(res); A/2 res; B/1 nc(res);
   (35) G$b$ dfen;
   (36) G/1 res; G/2 and G/3 nc(op);
   (37) A$b$ and B$b$ dfen; F$a$ and K$a$ ren;
   (38) A/1, A/2 and B/1 nc(res); F/1, K/1, K/2 and K/3 op;
   (39) B$a$ ren;
   (40) B/1 op;
   (41) G$a$ ren;
   (42) G/1 op; G/2 and G/3 res;
   (43) A$b$ and B$b$ fen (B$a$ still ren from step (39)); F$a$ and K$a$ dren;
   (44) A/1 and A/2 nc(res); K/1 res; B/1, F/1, K/2 and K/3 nc(op);
   (45) B$a$ dren; (B$b$ still fen from step (43));
   (46) B/1 res;
   (47) G$a$ dren;
   (48) G/1 res; G/2 and G/3 nc(res);
   (49) A$b$ and B$b$ dfen; F$b$ fen; C$a$ ren; RL1 en;
   (50) A/1 and A/2 nc(res); C/1 and F/1 res; C/2, 1/1 and 1/2 op.

Thus the effect of the third stepping pulse is not equivalent to the effects of the first and second stepping pulses, in that contact K/1 gives effect to additional steps, making 22 in all, after which the switch is in the same state as it was after Stage I ("Power On") except that C$a$ is reverse energised, contact sets H/1, E/2, E/3, K/2, and K/3 are operated and C/1 is restored.

A fourth stepping pulse de-energises (dren) C$a$ and (den) RL1, reverse instead of forward energises RLF/1, (through winding F$a$), reverse energises H$a$ and energises RL2, after a furtehr twelve steps (51) to 62. This restores C/2, H/1 1/1, and 1/2 and operates F/1, H/2, 2/1, and 2/2.

A fifth stepping pulse de-energises (dren) H$a$ and (den) RL2, forward instead of reverse energises RLF/1, (through winding F$b$) reverse energises E$a$ and energises RL3, after another twelve steps (63) to (74).

A sixth stepping pulse restores the switch to exactly the state as after Stage I.

The switch is thus a six position stepping switch.

If positive potential is applied to any of terminals H1, H2, and H3, then the closure of contact sets C/2, H/2, and E/1 has the same effect, mutatis mutandis, as the above-described effect of the closure of K/1 at step (38), causing the switch to carry out a sequence of steps corresponding to steps (39) to (50), "skipping" one position.

Figure 2B:
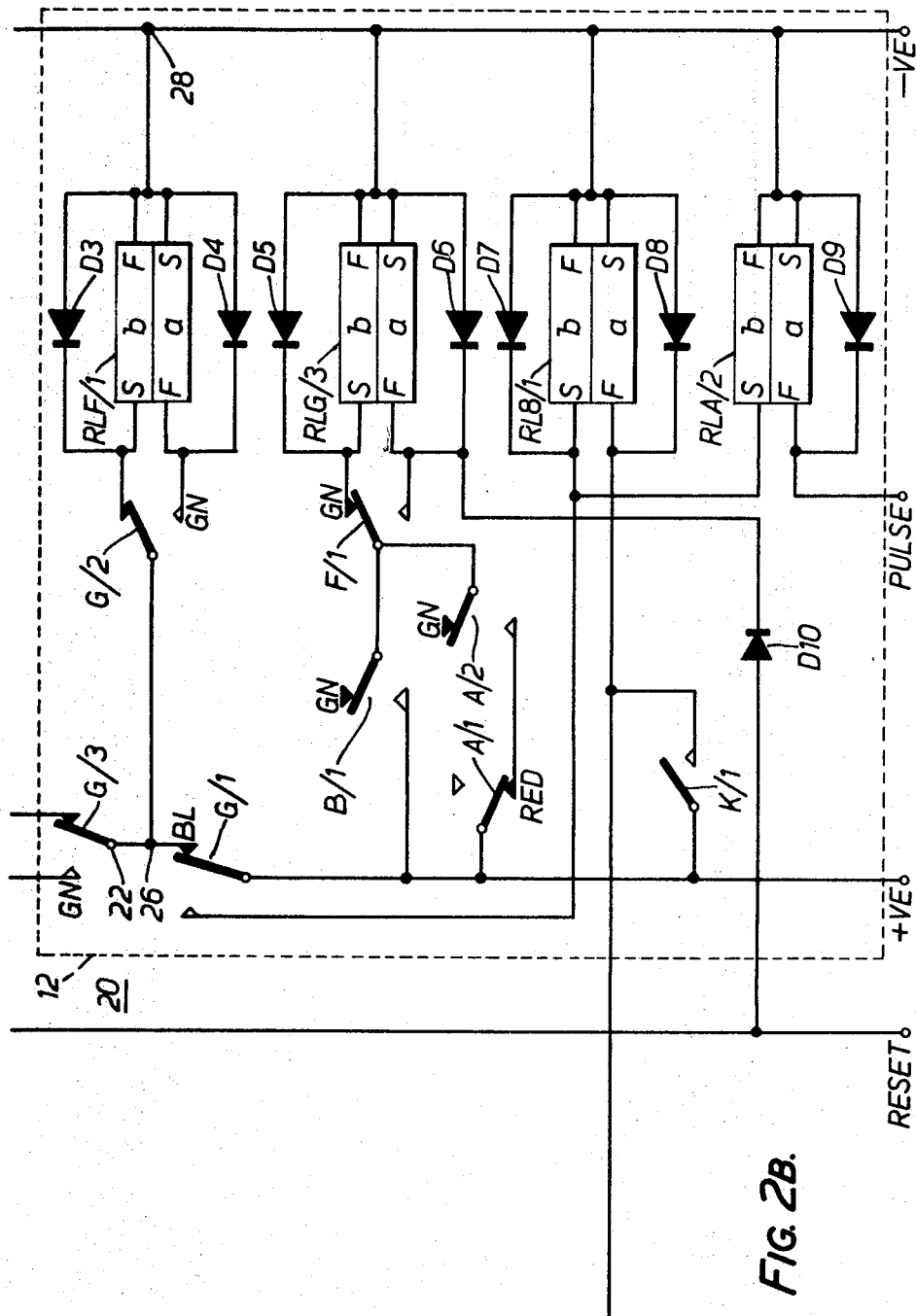
Figure 2C:
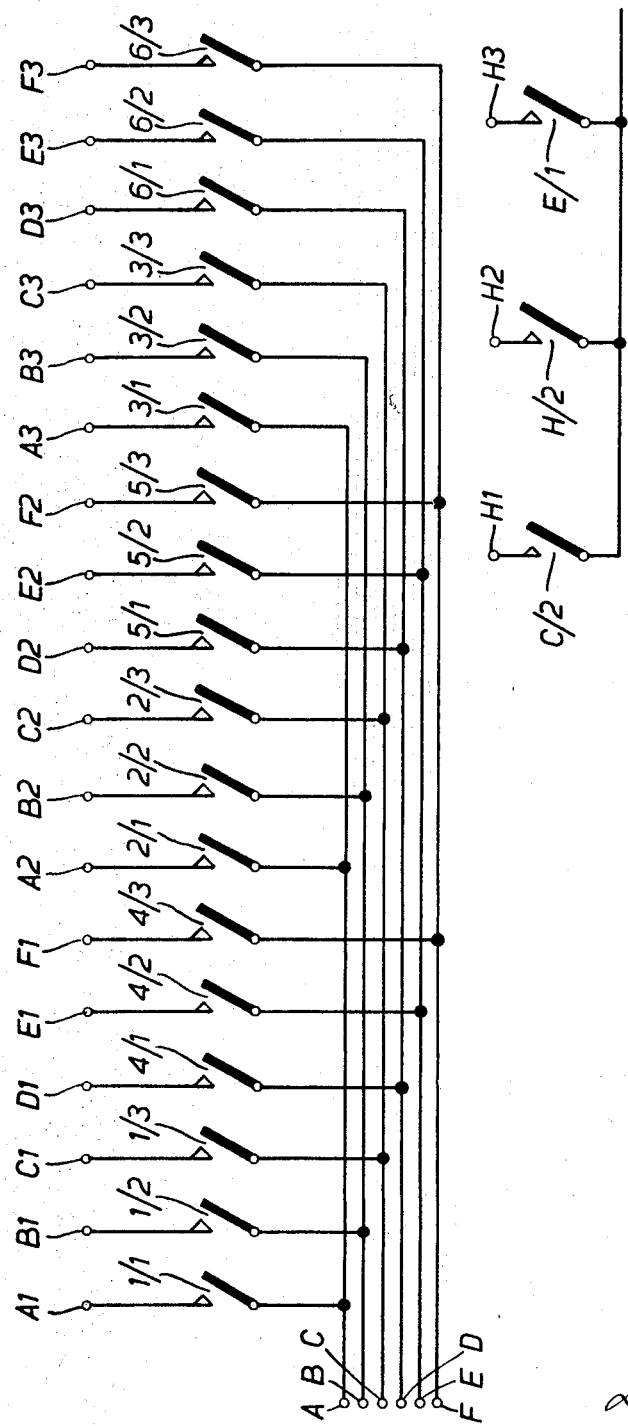

Switch 20 of FIG. 2 is similar to switch 10 of FIG. 1, and similar parts are similarly referenced. It differs in having three further relays RL4, RL5, and RL6 with their windings in parallel with the windings of relays RL1, RL2, and RL3 respectively, and with respective contact sets RL4/1, RL5/1, and RL6/1; RL4/2, RL5/2, and RL6/2; and RL4/3, RL5/3, and RL6/3 connected to further terminals D1, D2, D3, E1, E2, E3, F1, F2, and F3 and common terminals D, E, and F as shown, making six banks or gangs A to F.

Figure 3B:
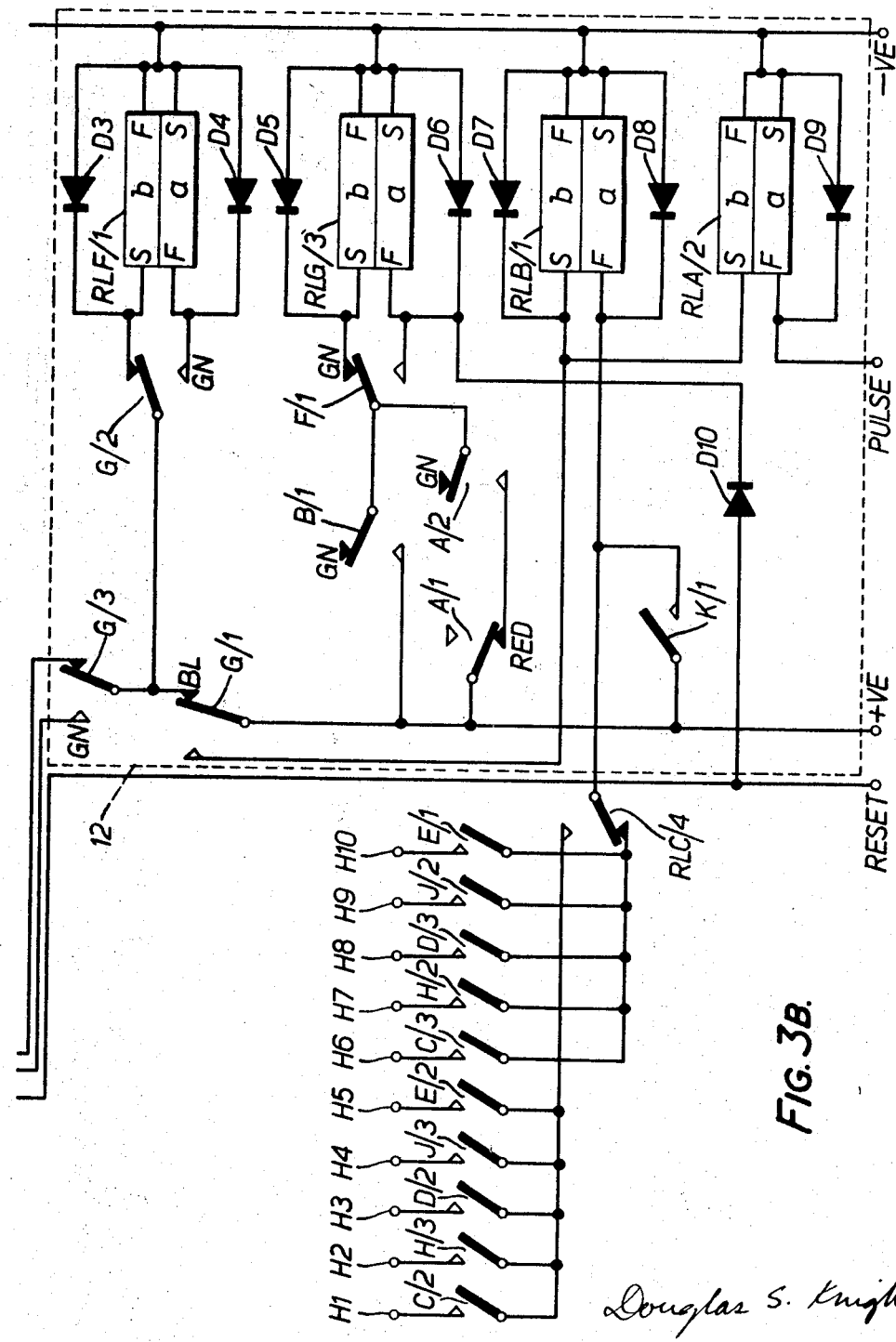
FIG. 3 illustrates the manner of arrangement of the circuit diagrams of FIGS. 3A, 3B, and 3C to define a ten-step four-bank "uniselector" switch in accordance with the invention.
Figure 3C:
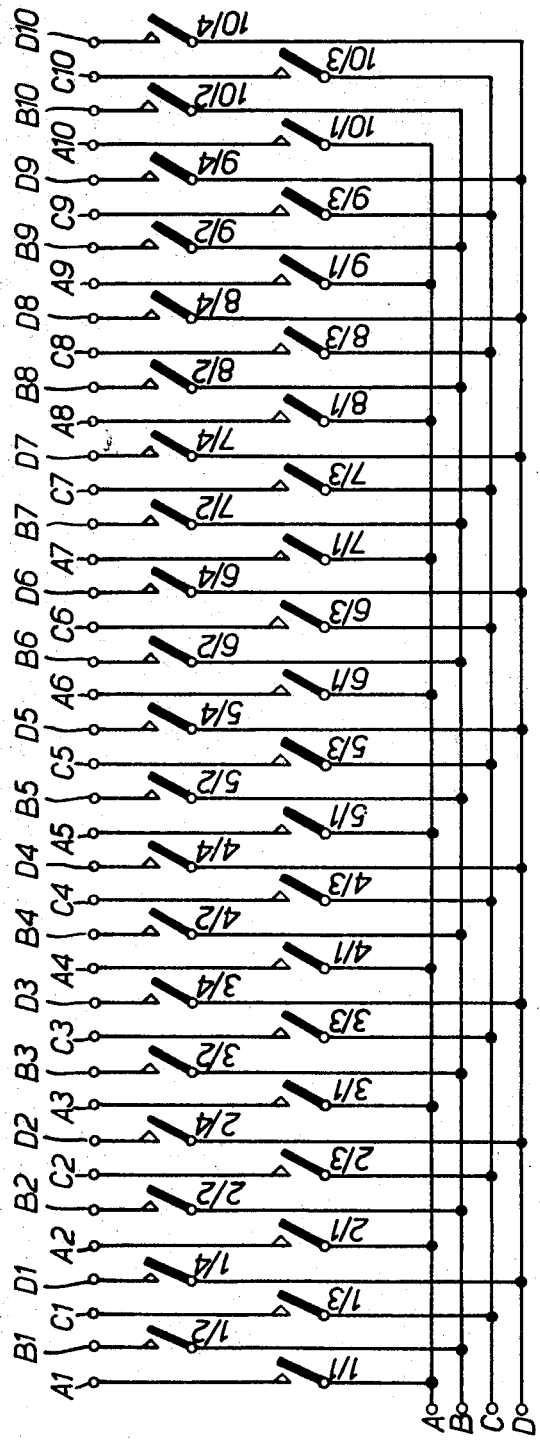

Relay 30 of FIG. 3 is basically similar to relays 10 and 20 of FIGS. 1 and 2, and similar parts are similarly referenced. However, relays RLC and RLH of switch 30 each have two further contact sets C/3, C/4, H/3, and H/4 by reason of two additional relays RLD and RLJ to form an augmented series of relays RLC, RLH, RLD, RLJ, RLE, and RLK having ten positions corresponding to the six positions of switches 10 and 20. The windings of a first series of five relays RL1 to RL5 are connected in series with respective diodes D11 to D15 across Ca, Ha, Da, Ja, Ea to energise with forward energisation of the latter. The windings of a second series of relays RL6 to RL10 are connected in series with respective diodes D16 to D20 in "anti-parallel" with RL1 to RL5, to energise with reverse energisation of Ca, Ha, Da, Ja and Ea. Thus relays RL1 to RL10 operate one-by-one in sequence. Respective contact sets 1/1 to 1/4, 2/1 to 2/4, 3/1 to 3/4 and so on, up to 10/1 to 10/4, serve terminals A1 to D1, A2 to D2, A3 to D3 and so on, up to A10 to D10, and common terminals A to D.

Contact set C/4 of relay RLC of switch 30 is a bistable contact set which connects C/2, H/3, D/2, J/3, and E/2 to Ba over the first five positions of switch 30, and C/3, H/2, D/3, J/2, and E/1 to Ba over the next five positions. Terminals H1 to H10 correspond to H1 to H3 of switches 10 and 20.

Figure 4:
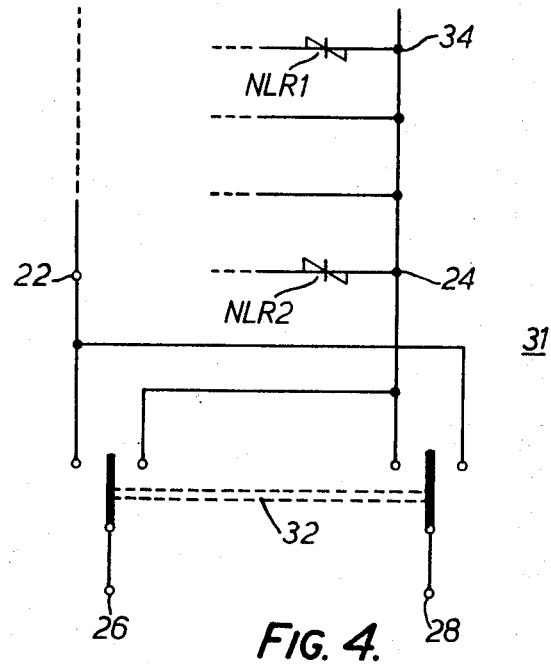
FIG. 4 is a circuit diagram of a modification to parts of the switches of FIGS. 1 to 3.

In one modification 31, shown in FIG. 4, to switches 10 and 20, instead of connecting terminals 22 and 24 of circuit 14 respectively to terminals 26 and 28 of circuit 16, a two-pole changeover switch 32 can be operated to connect terminals 22 and 24 to terminals 28 and 26 respectively thus reversing the sequence of operation of relays RLC, RLH, RLE, and RLK to K, E, H, and C respectively, and non-linear resistors NLR1 and NLR2 (non polarity-conscious) are substituted for diodes D1 and D2 at terminals 24 and 34.

A similar modification may be made to switch 30.

It will be appreciated that the effect of each of switches 10 and 20 is that of a three position switch so far as the output contacts are concerned.

Figure 5:
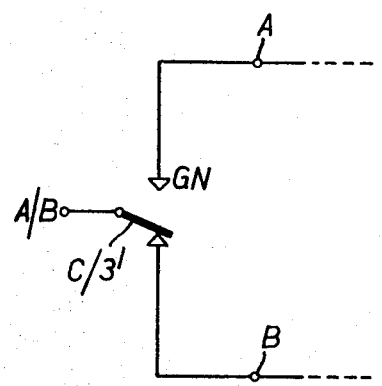
FIG. 5 is a circuit diagram of another modification to the switch of FIG. 1.

Switch 10 may be modified to a six-position single bank switch 33 as shown in FIG. 5 by connecting an additional bistable contact set C/3 (similar to contact set C/1), between terminals A and B, for operation by winding Ca, for example, so that over three positions terminals A1, A2, and A3 are connected in sequence to the single common terminal A/B with the additional contact set C/3' in one position (that shown), and over the next three steps, with the contact set C/3 in the other position, B1, B2, and B3 are connected to the common terminal A/B. (It will be appreciated that C/3' is analogous to C/4 in switch 30.)

Figure 6:
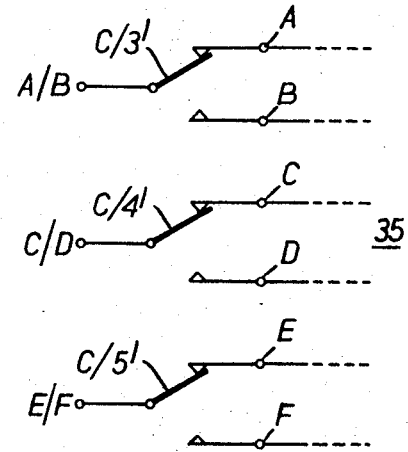
FIG. 6 is a circuit diagram of an analogous modification to the switch of FIG. 2.

Switch 20 may be correspondingly modified to a six-position three-gang switch 35 as shown in FIG. 6 by means of three additional bistable contact sets C/3', C/4', and C/5', all operable by Ca, connected between A and B, C and D, and E and F, for example.

FIGS. 7a and 7b together show an alternative modification 37 to switch 20 in which pairs of terminals A and D, B and E, C and F are respectively connected together in pairs to three output terminals A/D, B/E, and C/F, as shown in FIG. 7a.

FIG. 7b shows diodes D21 to D26 (analogous to diodes D11 to D20 of switch 30 in FIG. 3), in series with the respective relay windings RL1/3 to RL6/3, the corresponding pairs of diodes being in anti-parallel in the same manner as diodes D11 to D20 of FIG. 3, with similar effect.

In all switches 10, 20, and 30, 31, 33, 35, and 37 "break" before "make" of contacts 1/1 to 3/2, 6/3, 10/4 is reasonably ensured by the interval between de-energisation of each respective relay and energisation of the next in sequence, for example, Ca in step (9) and Ha in step (13). It will be observed that the bistable contacts in circuits 12 and 14 change over when "off load" (G/1 op) thus making their operation less arduous.

Figure 8A:
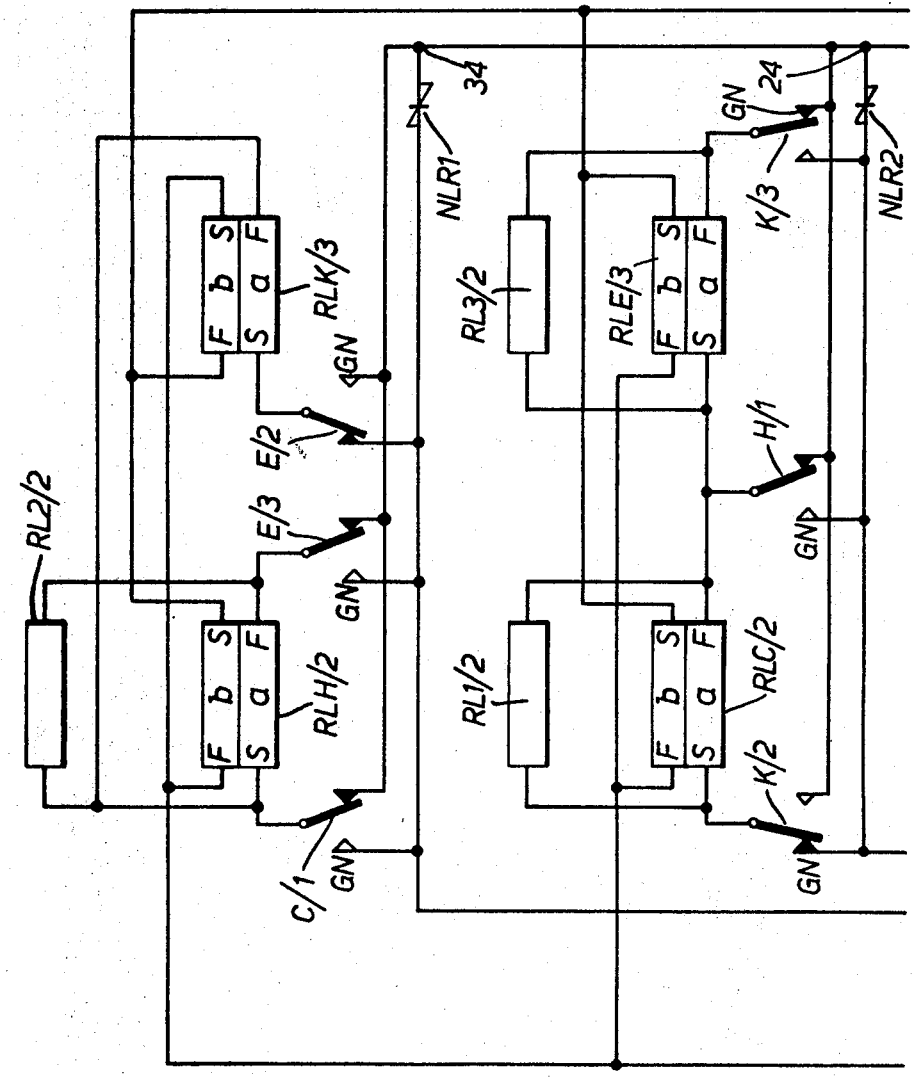
FIG. 8 illustrates the manner of arrangement of the circuit diagrams of FIGS. 8A and 8B to define a reversible "uniselector" switch in accordance with the invention.
Figure 8B:
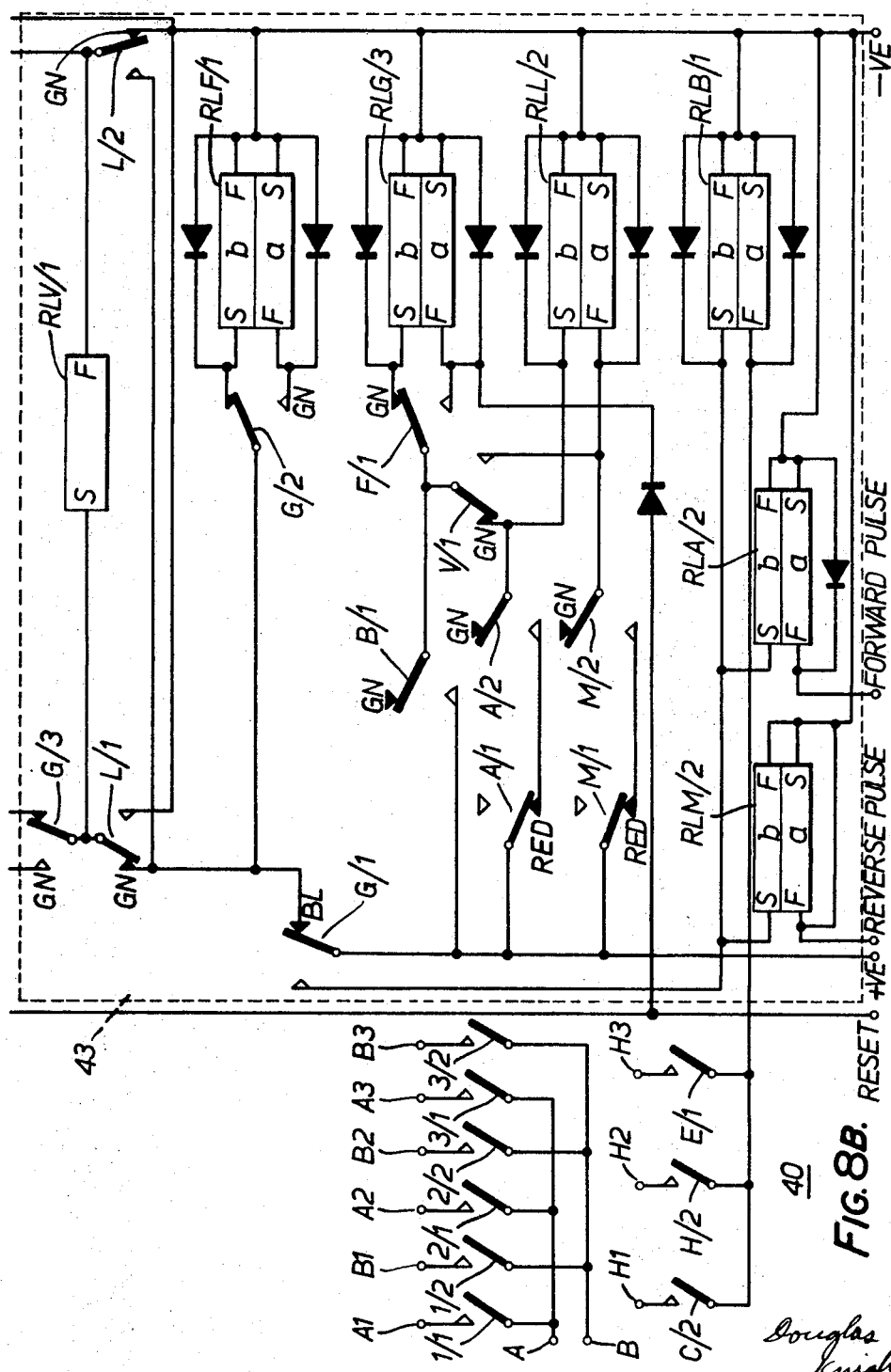

FIG. 8 illustrates a switch 40 which is basically similar to switch 10, so that corresponding parts have been given corresponding references. However, instead of the single "PULSE" input terminal of drive circuit 12 of switch 10, switch 40 has a modified drive circuit 43 with two such input terminals, "FORWARD PULSE" and "REVERSE PULSE." Positive pulses to the FORWARD PULSE terminal cause operation of relays RLC, RLH, RLE, and RLK in the same ("forward") sequence as switch 10. Positive pulses to the REVERSE PULSE terminal, however, cause operation of these relays in the reverse sequence.

In addition to the relays also present in switch 10, drive circuit 43 of switch 40 has double-wound relays RLL and RLM, and a single-wound relay RLV, with associated windings and contact sets arranged as shown. Bistable contact sets L/1, L/2, M/2, and V/1 are like contact set A/2, closed to GN when +ve is applied to the S terminal of either winding a or b (in the case of relays RLL and RLM). Monostable contact set M/1 is like A/1, operated away from RED with +ve applied to either F terminal of solenoid RLM/2.

Non-linear resistors NLR1 and NLR2 are used in switch 40 in place of diodes D1 and D2, as with modified switch 31, at terminals 24 and 34.

There follows a description of operation of switch 40 over two forward step sequences followed by a reverse step sequence, commencing with "Power On"—the application of positive to +VE after resetting.

For the purpose of this description "forward" is defined as alternating the connection to A & B respectively from A1 and B1 to A2 and B2, to A3 and B3 and reverse is defined as altering the connection to A and B respectively from A3 and B3 to A2 and B2 to A1 and B1.

(I) "Power On":
    (1) Ca, Fb and V fen and RL1 en (energise);
    (2) C/1, C/2, 1/1, 1/2 op: F/1 V/1 nc(res);
(II) First Forward Step
"Pulse Commences":
    (3) Aa ren;
    (4) A/1 and A/2 op in preparation;
(III) First Forward Step
Pulse Ceases:
    (5) Aa dren (de-energises);
    (6) A/1 res; A/2 nc(op);
    (7) Lb and Gb fen;
    (8) L/1 and L/2 nc(res); G/1 G/2 and G/3 op;
    (9) Ca, Fb and V dfen and RL1 den (de-energise) and Ab, Bb, Mb fen;
    (10) A/1 nc(res); A/2 res B/1, M/1 M/2 nc(res); C/1 nc(op) C/2, 1/1, 1/2 res; F/1 nc(res);
    (11) Gb and Lb defen;
    (12) G/1 res, G/2 and G/3 nc(op); L/1 and L/2 nc(res);
    (13) Ab, Bb, and Mb dfen, Ha and V fen, Fa ren, RL2 en;
    (14) H/1 and H/2 op, F/1 op, V/1 nc(res) and 2/1 and 2/2 op.

Thus, the nett result of the first stepping pulse has been the de-energisation of relays RLC and RL1, the reverse instead of forward energisation of relay RLF and the (forward) energisation of relays RLH and RL2, the restoration of contact sets C/2, 1/1, 1/2 and the operation of contact sets C/1, F/1, G/2, G/3, H/1, H/2, 2/1, and 2/2.

The practical effect of this has been to switch the connections of terminals A & B respectively from A1 and B1 terminals (to which they became connected at "Power On") to A2 and B2 in twelve stages.

By reason of the above mentioned operation of C/1, G/2, G/3, H/1, and H/2, the nett effect of commencement (Stage IV) and cessation (Stage V) of a second stepping pulse will be the de-energisation of relays RLH and RL2, the forward instead of reverse energisation of relay RLF and the (forward) energisation of relays RLE and RL3, accompanied by restoration of contact sets F/1, G/2, G/3, H/2, 2/1, and 2/2 and operation of contact sets E/2, E/3, 3/1, and 3/2 so that terminals A and B are now respectively connected to terminals A/3 and B/3 in a further twelve stages (15) to (26) not described in detail.

A pulse applied to the REVERSE PULSE terminal has the following effect.

Reverse Pulse
Commences:
   (27) M*a* ren;
   (28) M/1 and M/2 op;
Reverse Pulse
Ceases:
   (29) M*a* dren;
   (30) M/1 res, M/2 nc(op);
   (31) L*a* ren;
   (32) L/1 and L/2 op;
   (33) E*a*, RL3 and V ren;
   (34) E/1, 3/1, 3/2 nc(op); E/2, E/3 res; V/1 op;
   (35) G*b* fen;
   (36) G/1, G/2, and G/3 op;
   (37) E*a* and V dren, RL3 den, A*b*, B*b*, M*b* fen;
   (38) E/1, 3/1, 3/2 res, E/2, E/3 nc(res), A/1, A/2 nc(res), B/1 nc(res), M/1 nc(res), M/2 res;
   (39) G*b* dfen, L*a* dren;
   (40) G/1 res, G/2, G/3 nc(op), L/1, L/2 nc(op);
   (41) H*a* ren, RL2 en, F*a* ren, V ren;
   (42) H/1 res, H/2, 2/1, 2/2 op, F/1 op, V nc(op).

Thus the nett result of a pulse to the REVERSE PULSE terminal has been the de-energisation of relays RLE and RL3, the reverse instead of forward energisation of relays RLF and RLV, the restoration of contact sets E/1, E/2, E/3, 3/1, 3/2, H/1 and the operation of contact sets F/1, H/2, G/2, G/3, V/1, 2/1, and 2/2.

The practical effect of this has been to switch the connections of terminals A & B respectively from A/3 and B/3 to A/2 and B/2.

Similarly, the net effect of a further pulse at the reverse pulse terminal will be to reverse energise relays RLC and RL1 and de-energise relays RLH and RL2. Relays RLL, RLV, remaining as at steps (41) and (42) or alternatively by a similar sequence, a pulse at the forward pulse terminal will restore relays RLL and RLV and re-operate relays RLE and RL3 de-energising relays RLH and RL2.

It will be observed from FIG. 8 that "resetting" of relays RLC, RLH, RLE, and RLK of switch 40 through the "*b*" wnidings is unaffected by the state of contacts L/1 and L/2, which only affect the "*a*" windings.

Figure 9B:
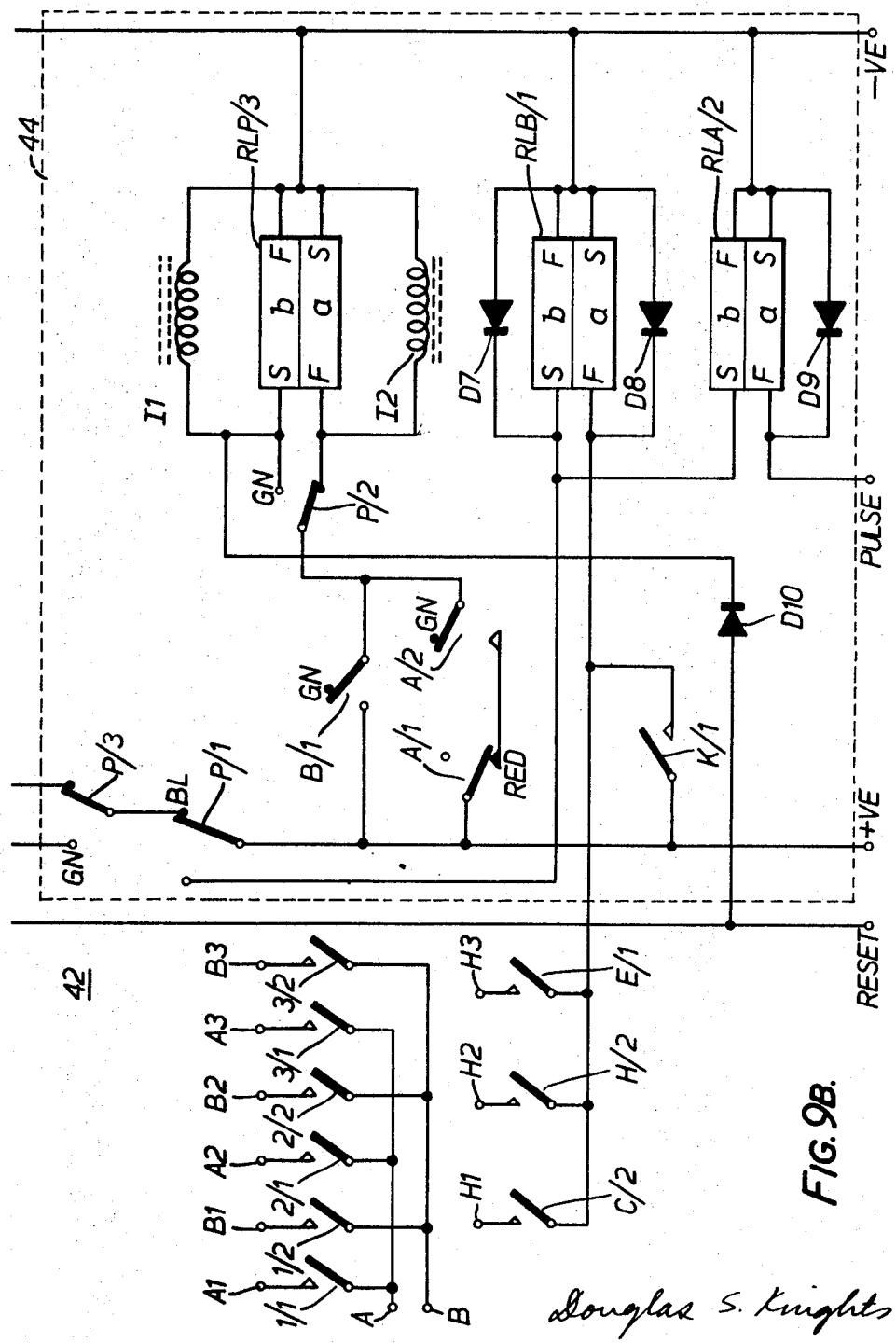
FIG. 9 illustrates the manner of arrangement of the circuit diagrams of FIGS. 9A and 9B to define another "uniselector" switch in accordance with the invention.

FIG. 9 illustrates another modified switch 42 which is basically similar to switch 10, but has a modified drive sub-circuit 44 in place of sub-circuit 12.

The modified drive sub-circuit 44 has, instead of relays RLF and RLG, one double-wound relay RLP and two iron-cored inductors I1 and I2 in parallel with he respective "*b*" and "*a*" windings of relay RLP. Diodes D3 to D6 are also omitted.

Contact set P/1 is the same type as G/1 in switch 10, and will be seen to have a similar function.

Likewise, contact sets P/2 and P/3 correspond to, and are of the same type as, G/2 and G/3, which they replace.

It will be seen that each inductor I1, I2 is arranged to be energised at the same time as its respective winding "*b*," "*a*" of relay RLP. Upon de-energisation, the highly inductive inductor I1, I2 develops a higher "back E.M.F." than the winding "*b*," "*a*," with the effect of reversing the current flow through the winding.

Relays RLA and RLB are retained and perform the same functions as before. Contacts A/1 and A/2 operate relay RLP/3 and for hunting contact B/1 operates relay RLP/3. Thus break before make action of the output contacts is retained and hunting can be performed as before.

The basic difference when relay RLP/3 is operated in conjunction with relays RLA/2 and RLB/1 is that when contacts A/1 and A/2 operate relay RLP/3 on cessation of the pulse, contact P/3 will not change-over until A/2 again opens, but P/1 will operate immediately. Relay RLP/3 is thus energised, removing power from the output stepping relays for a sufficient length of time to ensure break-before-break action.

A sequence of operation is described below following a reset pulse but prior to the connection of power to terminal +VE.

Power On:
   (1) C*a* fen and RL1 en;
   (2) C/1, C/2, 1/1, 1/2 op.
First Stepping Pulse Commences:
   (3) A*a* ren;
   (4) A/1 and A/2 op in preparation;
First Stepping Pulse Ceases:
   (5) A*a* dren
   (6) A/1 res; A/2 nc(op);
   (7) P*a* ren and I2 en;
   (8) P/1 op; P/2 and P/3 nc(res);
   (9) A*b* and B*b* fen;
   (10) A/1 nc(res); A/2 res; B/1 nc(res);
   (11) P*a* dren;
Followed immediately by:
   (12) P*a* fen; back E.M.F. of inductor I2 decaying to zero;
   (13) P/1 res; P/2 and P/3 op;
   (14) H*a* fen, RL2 en.

It will be apparent that drive sub-circuit 44 in switch 42 has the same effect as drive sub-circuit 16 in switch 10.

The basic specification that each uniselector switch described above is able to meet is a follows:
   (1) The switch steps when the input pulse ceases.
   (2) The duration of the input pulse over and above the minimum length required will not affect the switch.
   (3) The output contacts (such as 1/1, 1/2) have a break-before-make action.
   (4) The switch has a built-in memory whereby removal and re-connection of the power supply will not cause the switch to step or alter its last selected position.
   (5) The switch is capable of being arranged to hunt to any given position and programming to skip certain positions and/or (in the case of switch 31, 40) run forward or in reverse.
   (6) The switch operates in a manner equivalent to a rotary action type of uniselector switch.

What is claimed is:

1. An electric stepping switch comprising a drive circuit which is responsive to a sequence of input pulses to energise two terminals in the switch alternately, a series of energising windings arranged to be successively energised in sequence and connected alternately with respect to said sequence to said two terminals, a series of bistable contact sets each operable upon energisation of a respective one of said windings to prepare the next winding in the sequence for energisation, and a series of output contact sets connected to respective output terminals of the switch and operable in sequence upon energisation of respective ones of said energising windings.

2. A switch as claimed in claim 1 wherein each said contact set is a sealed magnetic reed switch.

3. A switch as claimed in claim 1 wherein at least some of said bistable contact sets are changeover contact sets each operable upon energisation of a respective one of said windings to render the previous winding in said sequence of windings unresponsive to a subsequent alternation in the energisation of said two terminals.

4. A switch as claimed in claim 1 wherein the drive circuit is operative to de-energise either of said two terminals and to energise the other terminal upon cessation of an input pulse.

5. A switch as claimed in claim 4 wherein the drive circuit comprises a first relay which is operable from a first state to a second state upon energisation thereof with commencement of an input pulse, a second relay operable from a first state to a second or third state through a bistable contact set of the first relay in series with a normally closed monostable contact set of the first relay, upon de-energisation of the first relay with cessation of the pulse, said second relay being operative by means of a monostable contact set while energised to de-energise the energised one of said two terminals and to restore the first relay back to its first state whereby to de-energise said second relay, and said second relay being operable to each of said second and third states alternately after successive input pulses to the first relay whereby to prepare said two terminals alternately for energisation upon de-energisation of said second relay.

6. A switch as claimed in claim 5 wherein a changeover switch is selectively operable to reverse the polarity of energisation of said two terminals whereby to reverse the sequence of energisation of said windings.

7. A switch as claimed in claim 6 wherein the drive circuit has two input terminals for input pulses and controls the changeover switch according to which one of said two input terminals an input pulse is applied.

8. A switch according to claim 4 wherein the drive circuit includes a relay having at least one winding connected in parallel with an inductance, a switch operative to supply and cut off a direct current to the parallel combination of said winding of said relay and said inductance in response respectively to commencement and cessation of an input pulse to the switch, and at least one bistable magnetically operable changeover contact set unresponsive to the polarity of the direct current initially supplied to said winding of said relay but operable upon a reversal of current flow in said winding induced by said inductance upon said cut off of the direct curent to said parallel combination.

9. A switch as claimed in claim 1 wherein said energising windings are arranged to be energised in sequence in one polarity and then energised in sequence in the opposite polarity.

10. A switch as claimed in claim 9 wherein at least one pair of respective output contact sets are operable upon energisation of each energising winding and the pairs of output contact sets are connected in common to respective terminals of a common bistable contact set operable by one of said energising windings.

11. A switch as claimed in claim 9 wherein the windings of a respective pair of relays and a respective pair of polarising diodes are connected in anti-parallel with each energising winding, said output contact sets being operable in sequence by respective ones of said pairs of relays upon energisation of respective ones of said energising windings.

References Cited

UNITED STATES PATENTS

| | | | |
|---|---|---|---|
| 2,634,376 | 4/1953 | Eck | 317—139X |
| 2,760,005 | 8/1956 | Williamson et al. | 317—139X |
| 2,895,088 | 7/1959 | Koenig | 317—139 |
| 3,185,855 | 5/1965 | Kelley et al. | 317—139X |
| 3,187,231 | 6/1965 | Schonherr | 317—139 |
| 3,229,125 | 1/1966 | Deeks | 317—139X |
| 3,273,024 | 9/1966 | Sherman | 317—157 |
| 3,289,167 | 11/1966 | Swane | 317—139X |

FOREIGN PATENTS 849,133   9/1952   Germany.

HAROLD BROOME, Primary Examiner